US010678242B2

(12) United States Patent
Wiley

(10) Patent No.: US 10,678,242 B2
(45) Date of Patent: Jun. 9, 2020

(54) DIFFERENTIAL DRIVE ROBOTIC PLATFORM AND ASSEMBLY

(71) Applicant: Facebook, Inc., Menlo Park, CA (US)

(72) Inventor: Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 128 days.

(21) Appl. No.: 15/828,423

(22) Filed: Nov. 30, 2017

(65) Prior Publication Data

US 2019/0163183 A1 May 30, 2019

(51) Int. Cl.
| | |
|---|---|
| *G05D 1/00* | (2006.01) |
| *B25J 5/00* | (2006.01) |
| *B25J 9/08* | (2006.01) |
| *B25J 9/16* | (2006.01) |
| *B60L 1/00* | (2006.01) |
| *B62D 57/032* | (2006.01) |
| *B62D 57/02* | (2006.01) |
| *B62D 61/06* | (2006.01) |

(52) U.S. Cl.
CPC ............ *G05D 1/0088* (2013.01); *B25J 5/007* (2013.01); *B25J 9/08* (2013.01); *B25J 9/162* (2013.01); *B60L 1/00* (2013.01); *B62D 57/022* (2013.01); *B62D 57/032* (2013.01); *B62D 61/06* (2013.01)

(58) Field of Classification Search
None
See application file for complete search history.

(56) References Cited

U.S. PATENT DOCUMENTS

| | | | | |
|---|---|---|---|---|
| 4,463,821 A | * | 8/1984 | Falamak | ................ B62D 7/026 180/168 |
| 4,519,466 A | * | 5/1985 | Shiraishi | ................ B60B 19/00 180/252 |
| 4,616,730 A | | 10/1986 | Strehler et al. | |

(Continued)

FOREIGN PATENT DOCUMENTS

| | | |
|---|---|---|
| JP | 62-74774 A | 4/1987 |
| JP | 2004-295429 A | 10/2004 |

(Continued)

OTHER PUBLICATIONS

Notice of Allowance received for U.S. Appl. No. 15/828,365 dated May 21, 2019, 83 pages.

(Continued)

*Primary Examiner* — Jacob D Knutson
*Assistant Examiner* — Harold Eric Pahlck, III
(74) *Attorney, Agent, or Firm* — FisherBroyles, LLP

(57) ABSTRACT

A robotic platform may include a chassis, left and right wheel assemblies, and a controller. The left and right wheel assemblies may include a caster wheel, a motor, a shaft, and a bevel gear. The wheel may be mounted to an axle for rotation about a drive axis and steering about a steering axis. The drive shaft may have one end coupled to the axle and another end wrapped by a respective belt to control rotation of the shaft about the steering axis. The bevel gear may couple the shaft to the axle so rotation of the shaft about the steering axis controls rotation of the wheel about the drive axis to drive the platform in a substantially horizontal direction. The controller may control the left and right drive motors independently, to provide differential drive. Various other assemblies, robots, and methods are also disclosed.

20 Claims, 8 Drawing Sheets

(56) References Cited

U.S. PATENT DOCUMENTS

| | | | |
|---|---|---|---|
| 4,683,973 | A | 8/1987 | Honjo et al. |
| 4,778,024 | A | 10/1988 | Matsumoto et al. |
| 5,350,033 | A | 9/1994 | Kraft |
| 5,419,008 | A | 5/1995 | West |
| 5,515,934 | A | 5/1996 | Davis |
| 6,491,127 | B1 | 12/2002 | Holmberg |
| 7,024,842 | B2 * | 4/2006 | Hunt .................. A01D 34/008 56/6 |
| 7,384,233 | B2 | 6/2008 | Segerljung |
| 7,617,890 | B2 * | 11/2009 | Romig ................. A01D 34/008 180/12 |
| 8,348,002 | B2 | 1/2013 | Checketts et al. |
| 8,370,990 | B2 | 2/2013 | Yu et al. |
| 8,496,077 | B2 | 7/2013 | Nesnas et al. |
| 8,757,309 | B2 | 6/2014 | Schmitt et al. |
| 8,812,187 | B2 * | 8/2014 | Lunden .................. B60T 1/062 701/29.1 |
| 9,020,639 | B2 | 4/2015 | Bewley et al. |
| 9,359,005 | B2 * | 6/2016 | Doan .................... B60K 17/303 |
| 10,059,004 | B2 | 8/2018 | Inaba et al. |
| 10,065,690 | B2 | 9/2018 | Summer et al. |
| 10,207,403 | B1 | 2/2019 | Wiley |
| 10,286,558 | B1 | 5/2019 | Asada et al. |
| 10,421,326 | B2 | 9/2019 | Wiley et al. |
| 10,486,755 | B2 | 11/2019 | Wiley |
| 2004/0177474 | A1 | 9/2004 | Swanborough |
| 2007/0240928 | A1 | 10/2007 | Coltson et al. |
| 2012/0066846 | A1 | 3/2012 | Yu et al. |
| 2017/0043831 | A1 | 2/2017 | Zhu |
| 2018/0169685 | A1 | 6/2018 | Taylor et al. |
| 2018/0330325 | A1 | 11/2018 | Sibley |
| 2019/0160868 | A1 | 5/2019 | Wiley et al. |

FOREIGN PATENT DOCUMENTS

| | | |
|---|---|---|
| JP | 2010-094802 A | 4/2010 |
| JP | 2015-070981 A | 4/2015 |

OTHER PUBLICATIONS

Notice of Allowance received for U.S. Appl. No. 15/828,387 dated Jul. 31, 2019, 31 pages.
Preinterview First office Action received for U.S. Appl. No. 15/828,387 dated May 6, 2019, 9 pages.
Notice of Allowance received for U.S. Appl. No. 15/828,414 dated Oct. 11, 2018, 17 pages.
Preinterview First office Action received for U.S. Appl. No. 15/828,349 dated Aug. 14, 2019, 12 pages.
First Action Interview received for U.S. Appl. No. 15/828,349 dated Oct. 16, 2019, 12 pages.

* cited by examiner

DIFFERENTIAL DRIVE ROBOTIC PLATFORM AND ASSEMBLY

BACKGROUND

Robots have found use in a nearly unlimited number of applications, from mapping and exploring unknown terrain, to performing rescue missions in extreme environmental conditions, to performing surgeries in hospitals, and to managing data centers, among a host of other scenarios. Robots are typically mounted to a robotic platform to support the robot on a floor or other surface. Caster wheels may be mounted to the robotic platform to enable rolling or otherwise linear movement of the robot in a generally horizontal direction. Some robotic platforms may have caster wheels that are powered or driven. For example, a power assembly (such as an electric motor) may control rotation of a caster wheel's axle, which may in turn control rotation of the wheel thereabout to move the robot. Some powered or driven caster wheels may also include brake assemblies designed to retard rotation of the wheel axle and thus slow or stop rotation of the wheel, thereby slowing or stopping the robot. Traditionally, at least a portion of this power assembly (e.g., the motor), as well as the brake, is disposed within the circumference of the wheel, near the wheel hub and adjacent to the axle.

The placement of a power or brake assembly within the circumference of a caster wheel, however, can lead to various disadvantages. For example, when an electrical component of the power assembly (e.g., a motor) is disposed within the circumference of the wheel, the motor may be exposed to whatever conditions the wheel moves through. This is particularly problematic for robots that are intended to move through treacherous conditions or water.

In addition, when all or some of the power assembly is located within the circumference of the wheel, the electrical wires that provide electricity to the power assembly may limit the maneuverability of the robotic platform since the wheel may be unable to rotate 360 degrees without entangling the wires. This is especially disadvantageous for robots intended to perform highly maneuverable functions.

Positioning all or some of the power assembly within the circumference of the wheel may also lead to an increased risk of damage to the power assembly. For instance, when the driven caster wheel is part of a robot or other object that is susceptible to falling or being dropped, the power assembly may be damaged by such forceful impacts. Similar issues arise when positioning brake assemblies within the circumference of a caster wheel.

As such, the instant disclosure identifies and addresses a need for improved caster wheels and robotic platforms.

SUMMARY

As will be described in greater detail below, the instant disclosure describes a driven (or powered) robotic platform. The robotic platform may be driven by a power assembly that drives left and right driven wheel assemblies independently. The power assembly may drive each of the left and right driven wheel assemblies by controlling rotation of a respective drive shaft, which may be connected to a wheel axle via a bevel gear. Thus, the entire power assembly may be located outside the circumference of the wheel. The power assembly may include left and right drive motors that may enable differential drive to provide improved steering and maneuverability.

In one example, a robotic platform may include a chassis, left and right driven wheel assemblies, and a controller. The chassis may have oppositely disposed top and bottom sides, left and right sides, and a fore end and an aft end. The left and right driven wheel assemblies may be disposed proximate the aft end of the chassis. Each of the left and right driven wheel assemblies may include a caster wheel, a drive shaft, a drive motor, and a bevel gear. The caster wheels may each be mounted to an axle for rotation about a drive axis and for steering about a substantially vertical steering axis. The drive shafts may extend along the steering axis from a first drive shaft end to a second drive shaft end. The second drive shaft end may be coupled to the motor, and the bevel gear may couple the first drive shaft end to the axle such that rotation of the drive shaft about the steering axis controls rotation of the caster wheel about the drive axis to drive the robotic platform in a substantially horizontal direction. The controller may control the left and right drive motors independently of one another.

In some embodiments, the robotic platform may also include a steer assembly disposed on the chassis. The steer assembly may include a steer motor and a steer belt. Each driven wheel assembly may include a steer shaft extending along the steering axis from a first steer shaft end to a second steer shaft end. The first steer shaft end may be coupled to the wheel axle and the second shaft end may be wrapped by the steer belt such that the steer belt controls rotation of the steer shaft about the steering axis, thereby steering the caster wheels about the steering axis. The steer belt may be wrapped around the steer shaft of each of the left and right driven wheel assemblies such that the steer shafts rotate synchronously. The drive shaft may be concentrically arranged inside of the steer shaft.

In some embodiments, the robotic platform may include, for at least one of the left and right driven wheel assemblies, a disc brake disposed on the drive shaft dimensioned to retard motion of the drive shaft and thereby retard motion of the wheel. The disc brake may include (1) a disc disposed on the drive shaft and configured to rotate with the drive shaft about the steering axis, and (2) a pair of pads on top and bottom sides of the disc. The pads may be compressible against the disc to retard rotation of the disc and thereby retard rotation of the drive shaft.

In some embodiments, the drive axis and the steering axis together form an oblique angle such that the caster wheel is tilted relative to the steering axis. The caster wheel may be configured to freely rotate 360 degrees about the steering axis. The robotic platform may also include at least one idle caster wheel disposed proximate the fore end of the chassis. The second drive shaft end and the drive belt may be disposed on top of the chassis.

A robot having a chassis, left and right driven wheel assemblies, and a controller is also disclosed. The chassis may have oppositely disposed top and bottom sides, left and right sides, and a fore end and an aft end. The left and right driven wheel assemblies may be disposed proximate the aft end of the chassis. Each of the left and right driven wheel assemblies may include a caster wheel, a drive shaft, a motor, and a bevel gear. For each left and right driven wheel assembly, the caster wheel may be mounted to an axle for rotation about a drive axis and steering about a steering axis. The drive shaft may extend along the steering axis from a first drive shaft end to a second drive shaft end. The first drive shaft end may be coupled to the wheel axle and the second drive shaft end may be coupled to the motor. The bevel gear may couple the first drive shaft end to the axle such that rotation of the drive shaft about the steering axis controls rotation of the wheel about the drive axis to drive the robot in a substantially horizontal direction. The controller may be configured to control the left and right drive motors independently of one another.

A method of assembling a robotic platform is also disclosed. The method may include arranging a drive assembly on a chassis, assembling left and right driven wheel assemblies, mounting the left driven wheel assembly to a left side of the chassis, and mounting the right driven wheel assembly to the right side of the chassis.

Assembling left and right driven wheel assemblies may include mounting a caster wheel to a respective axle for rotation about a drive axis and steering about a substantially vertical steering axis and coupling a first end of a drive shaft to the axle with a bevel gear. The drive assembly may include a left drive motor and a left drive belt that is controlled by the left drive motor, and a right drive motor and a right drive belt that is controlled by the right drive motor. Each drive shaft may extend along the respective steering axis from the first drive shaft end to a second drive shaft end. The method may include wrapping the left drive belt around the drive shaft of the left caster wheel assembly, and wrapping the right drive belt around the drive shaft of the right caster wheel assembly. The method may also include electrically coupling a controller to the left and right drive motors to control the left and right drive motors independently from one another. Each bevel gear may couple the respective drive shaft to the axle such that rotation of the drive shaft about the steering axis controls rotation of the wheel about the drive axis to drive the robot in a substantially horizontal direction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
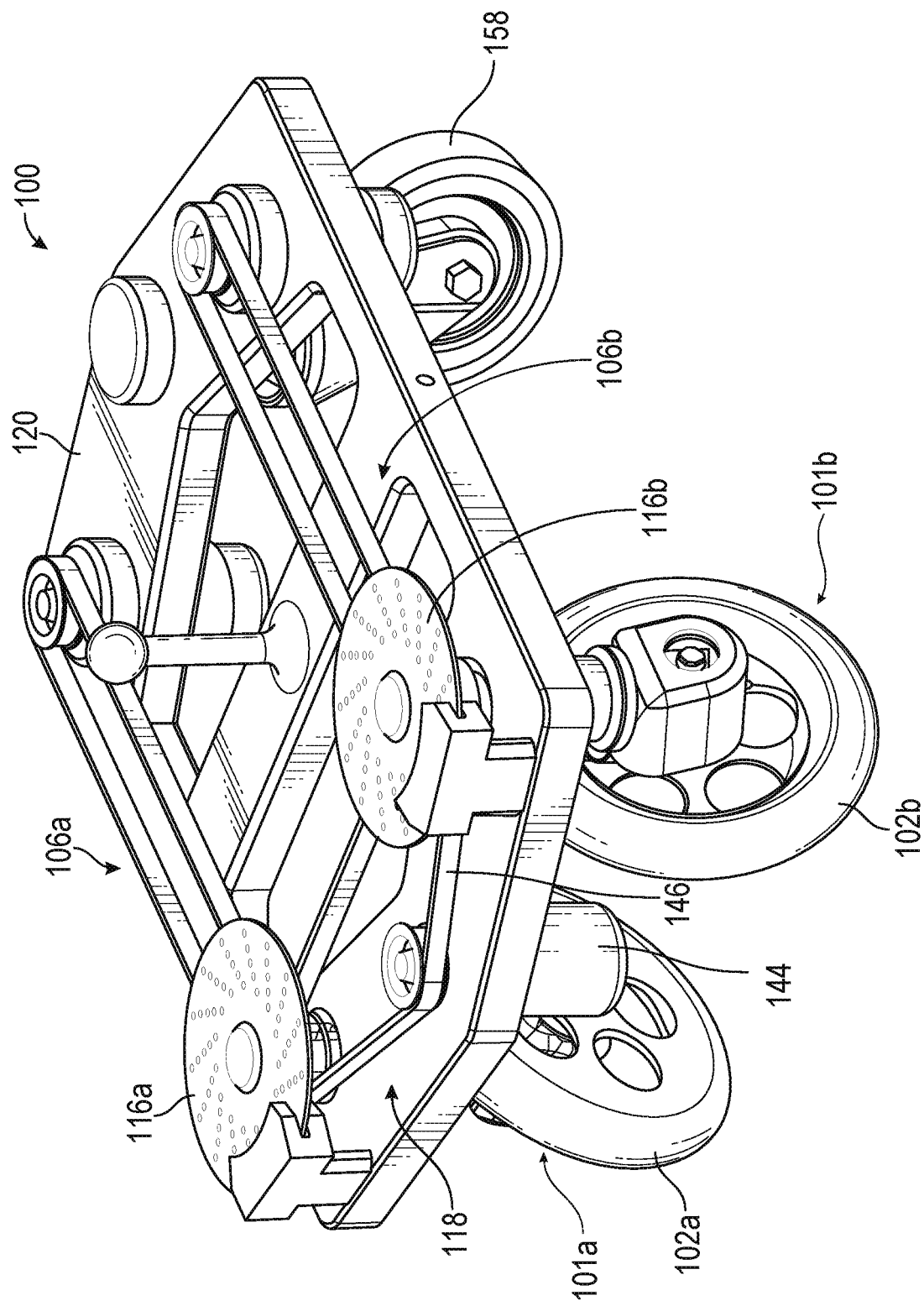
FIG. 1 is a rear, left perspective view of a differential drive robotic platform, according to an embodiment.
Figure 2:
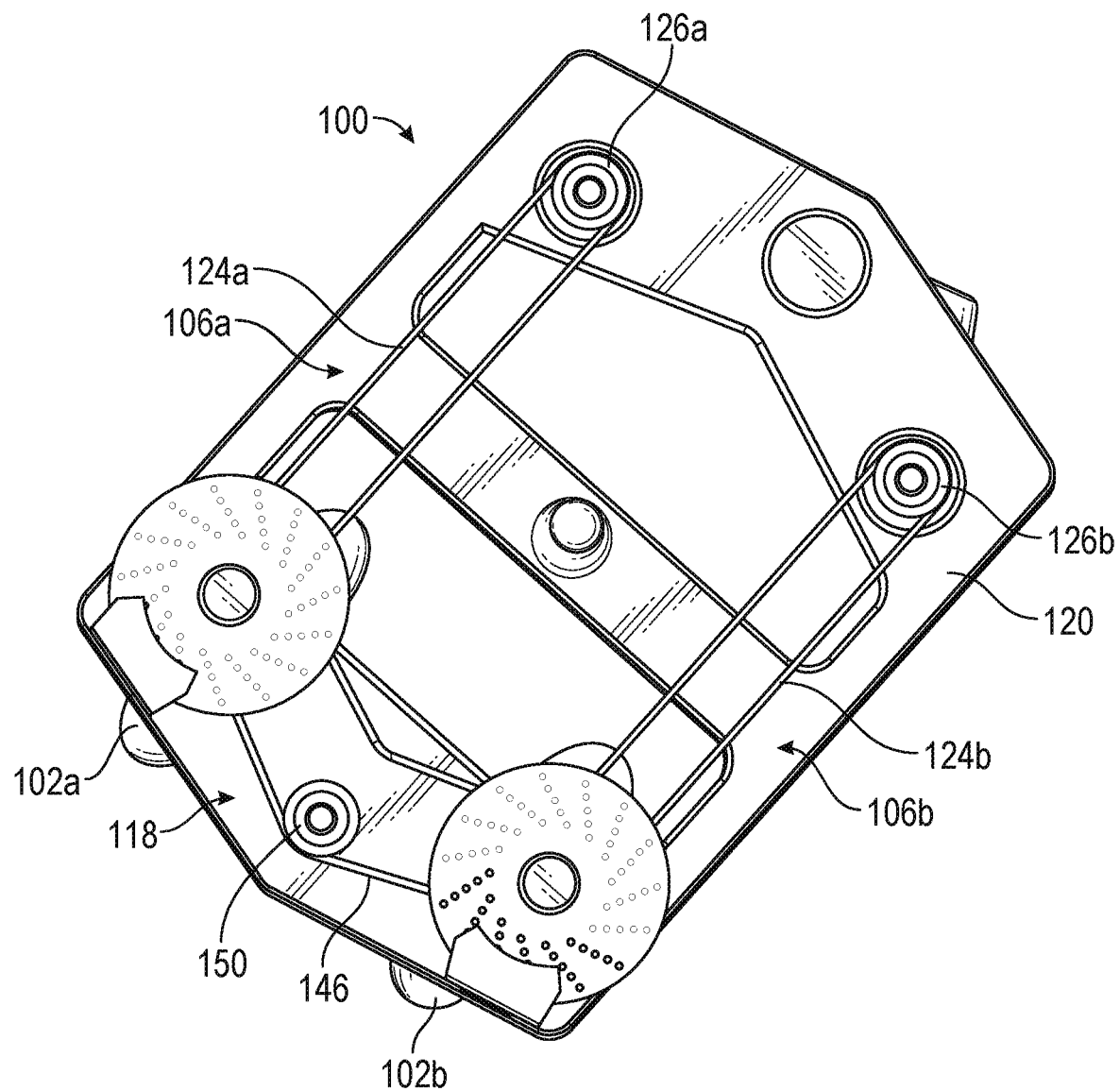
FIG. 2 is a top view of the robotic platform of FIG. 1.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to robotic platforms that are driven by caster wheel assemblies in a manner that may provide differential drive and/or a variety of other features and advantages. As will be explained in greater detail below, embodiments of the instant disclosure may include a robotic platform having left and right driven (or powered) caster wheels mounted on an aft end of a chassis. The caster wheels may each be driven by a respective left or right power assembly via a drive shaft and bevel gear arrangement. The left and right power assemblies may each drive rotation of the respective driven wheel about an axle to move the wheel in a substantially horizontal direction, while the wheel may be steerable about a drive shaft that extends along a substantially vertical steering axis. The respective power assembly may be connected to one end of the drive shaft to control its rotation about the steering axis. The other end of the drive shaft may be connected to the wheel axle via a bevel gear. The left and right power assemblies may each include a drive motor coupled to the drive shaft. The drive motors may thus control the drive shafts independently of one another. The drive shafts may each extend from the respective axle to a location above the chassis.

The devices and assemblies described herein may provide a number of features and advantages over traditional systems. For example, in some configurations, the entire power assemblies of driven caster wheels may be located distally from the wheels. As such, components of the power assemblies may be protected, for example, from environmental conditions that may surround the wheels. This may be particularly advantageous for robotic platforms intended to move through extreme weather conditions or through water. Also, a power assembly that is distally located from the wheel may be better protected from damaging forceful impacts that may occur, for instance, in configurations where the driven caster wheels are mounted to a robot that is susceptible to falling or being dropped. Another advantage of the driven caster wheel disclosed herein may be that configuration of the driven caster wheel may allow a caster wheel to freely rotate 360 degrees about its steering axis without becoming entangled by electrical wires or other components of the drive assembly. This driven caster wheel may also have a brake assembly that is disposed distally from the caster wheel (e.g., entirely above the chassis), which may similarly protect the brake assembly from impact and environmental damage. Furthermore, the left and right drive assemblies may be controlled independently of one another to enable differential drive, which may provide improved steering and maneuverability.

The following will provide, with reference to FIGS. 1-6, detailed descriptions of a robotic platform. FIG. 1 is a rear, left perspective view of a robotic platform 100, according to an embodiment. The robotic platform 100 may include a chassis 120, a right drive assembly 106a arranged on a right side of the chassis 120, a left drive assembly 106b arranged on a left side of the chassis 120, left and right wheel assemblies 101a, 101b disposed on the left and right sides of the chassis 120, and an idle caster wheel 158 disposed on the fore end of the chassis 120. While a single idle caster wheel 158 is shown coupled to robotic platform 100, an additional fixed or rotatable idle caster wheel (or multiple idle caster wheels) may be coupled to robotic platform 100. Furthermore, while the idle caster wheel 158 is shown to be rotatable around a vertical axis, the idle caster wheel 158 may also be configured to be fixed such that it does not rotate around a vertical axis.

The chassis 120 may have oppositely disposed top and bottom sides, a fore end and an aft end. The terms "fore" and "aft," in some embodiments, generally refer to relative positions on a robotic platform and are not necessarily indicative of a primary direction of movement of the robotic platform or of a configuration of a robot mounted on the robotic platform (e.g. the front of the robot on the platform may be positioned facing the fore end, the aft end, the right or left sides, etc.). Furthermore, the chassis 120 may have a variety of shapes, sizes, thicknesses, etc. in different embodiments of the instant disclosure.

The drive assemblies 106a, 106b may each include drive motors 122a, 122b (as referenced in FIG. 3) and drive belts 124a, 124b (as references in FIGS. 2 and 3) that are controlled by drive motors 122a, 122b. In some embodiments, the drive motors 122a, 122b generally represent any type or form of machine powered in any suitable manner (e.g., by electricity, internal combustion, etc.) to supply motive power for the robotic platform 100. Also, the drive belt 124a, 124b generally represent any type or form of transmission mechanism (e.g., belts, chains, driveshafts, etc.) for transferring power from a motor to a wheel assembly. Furthermore, while FIGS. 1-6 show the motors 122a, 122b as being positioned remotely from wheel assemblies 101a, 101b, the motors 122a, 122b may also be coupled directly above the wheel assemblies 101a, 101b such that rotating shafts of the motors 122a, 122b are coupled directly to wheel assemblies 101a, 101b.

While FIGS. 1-6 show and describe a robotic platform with two driven caster wheel assemblies, any suitable number of driven caster wheel assemblies may be provided while remaining within the scope of this disclosure. Furthermore, while the following description at times refers to only one of the wheel assemblies (e.g., the left wheel assembly 101a), it should be well understood that the description of the one-wheel assembly (e.g., the left wheel assembly 101a) may also apply to some or all of the other wheel assemblies (e.g., the right wheel assembly 101b). A more detailed description and discussion of the driven wheel assemblies described herein may be found in U.S. patent application Ser. No. 15/828,349, titled "DRIVEN CASTER WHEEL AND ASSEMBLY," filed on 30 Nov. 2017, the entirety of which is incorporated herein by reference.

Figure 6:
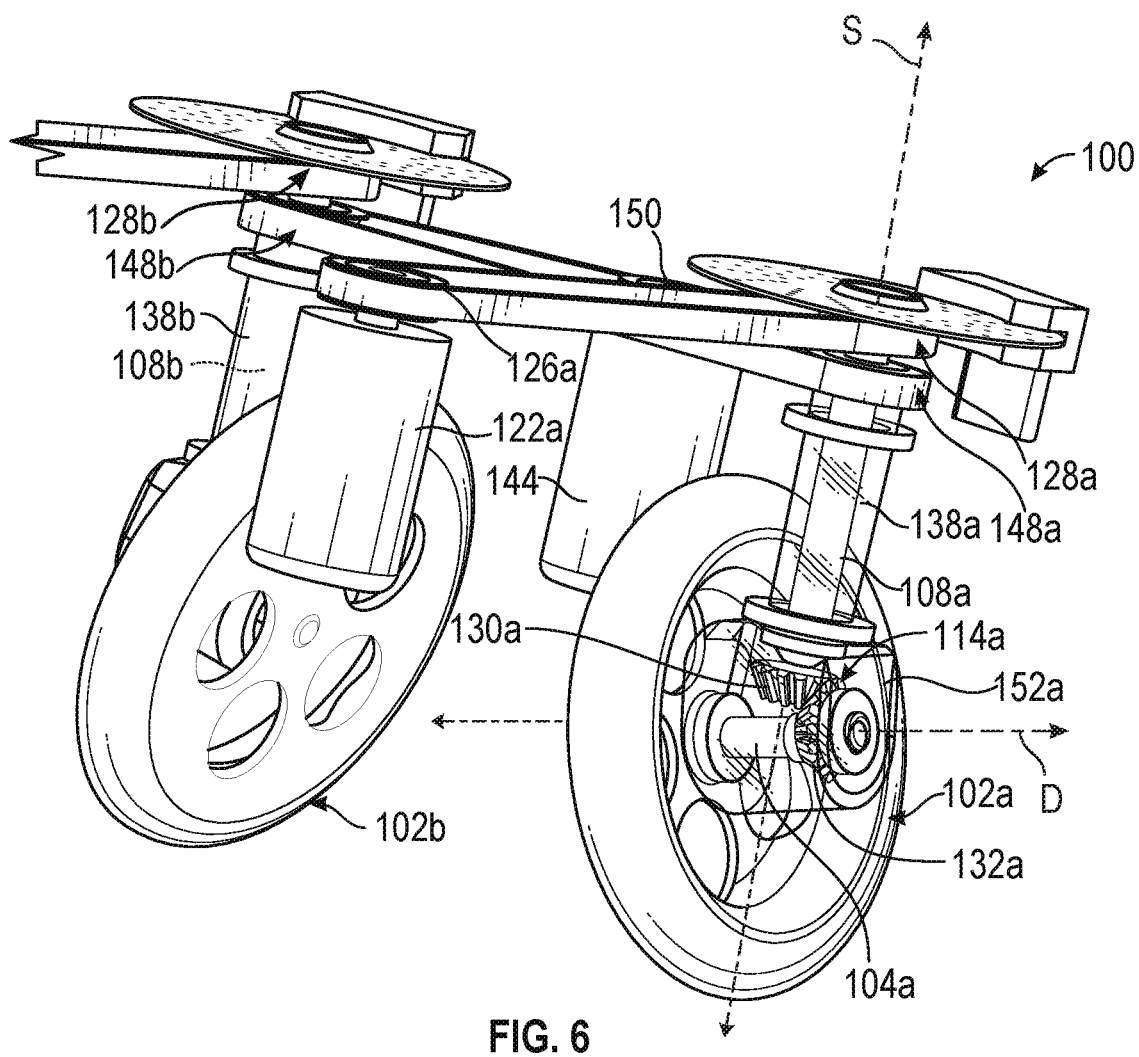
FIG. 6 is a right side view of the robotic platform of FIG. 1, with the chassis and a casting removed.

With reference to FIG. 6, wheel assembly 101a may include a wheel 102a mounted to an axle 104a, a drive shaft 108a, and a bevel gear 114a. The wheel 102a may be mounted to its respective axle 104a for rotation about a drive axis D. In this example, the rotation of the wheel 102a about the drive axis may be controlled by a drive assembly 106a, as shown in FIG. 1, that is located distally from the wheel 102a and on the chassis 120. The drive shaft 108a may extend substantially vertically (e.g., vertically or almost vertically) from the drive assembly 106a to the axle 104a and rotate about a substantially vertical steering axis S. The bevel gear 114a may connect the drive shaft 108a to the axle 104a to translate torque and power from the drive assembly 106a to the wheel 102a.

Figure 4:
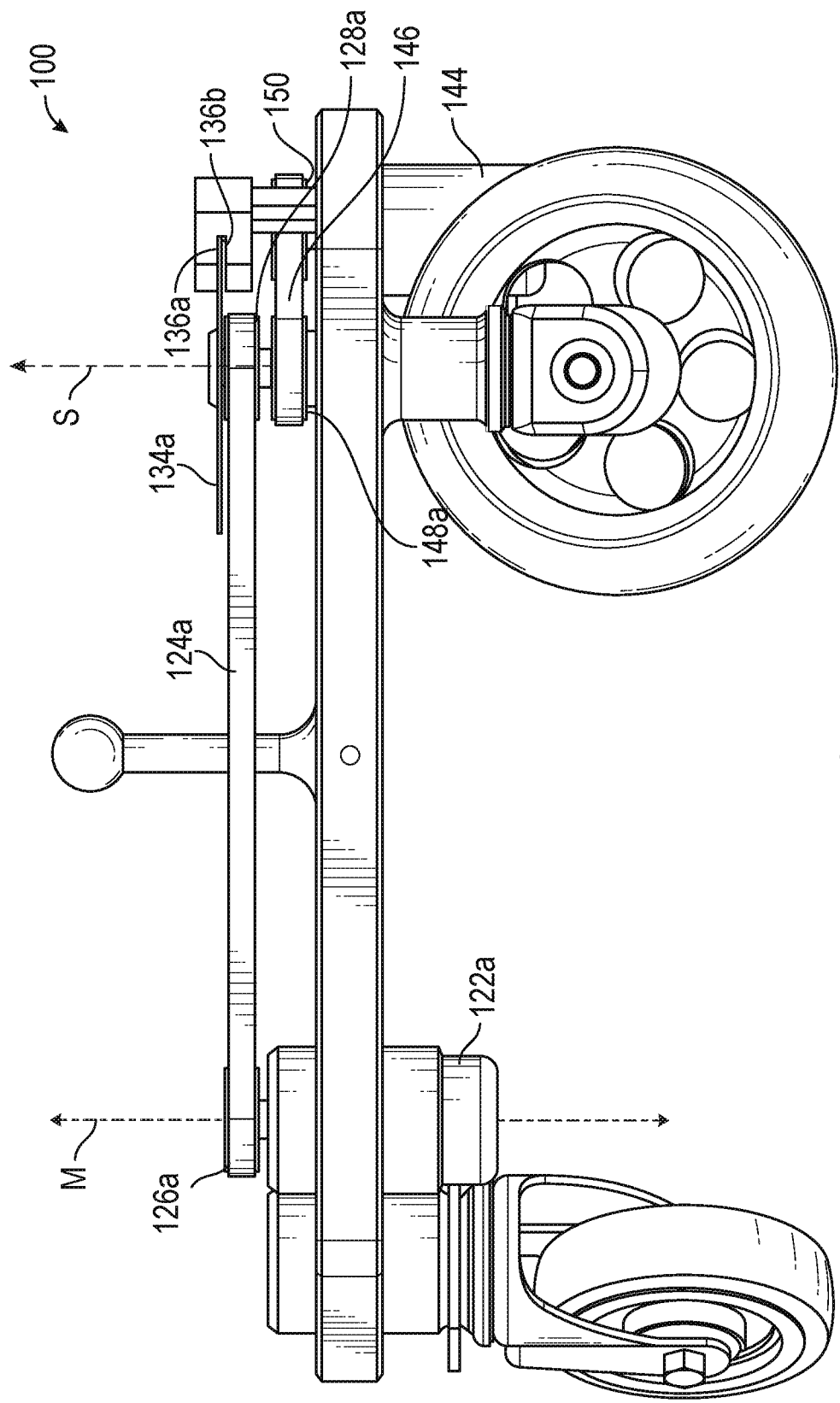
FIG. 4 is a right side view of the robotic platform of FIG. 1.

As shown in FIG. 4, the entire drive assembly 106a may be located distally from the wheel 102a. In this configuration, pulleys 126a, 128a and the drive belt 124a may be disposed on top of and chassis 120, which may protect the robotic platform from damage. For example, by positioning the power assembly's electrical components distally from the caster wheel, the robotic platform 100 may be able to drive through deep water or survive other environmental conditions.

Figure 3:
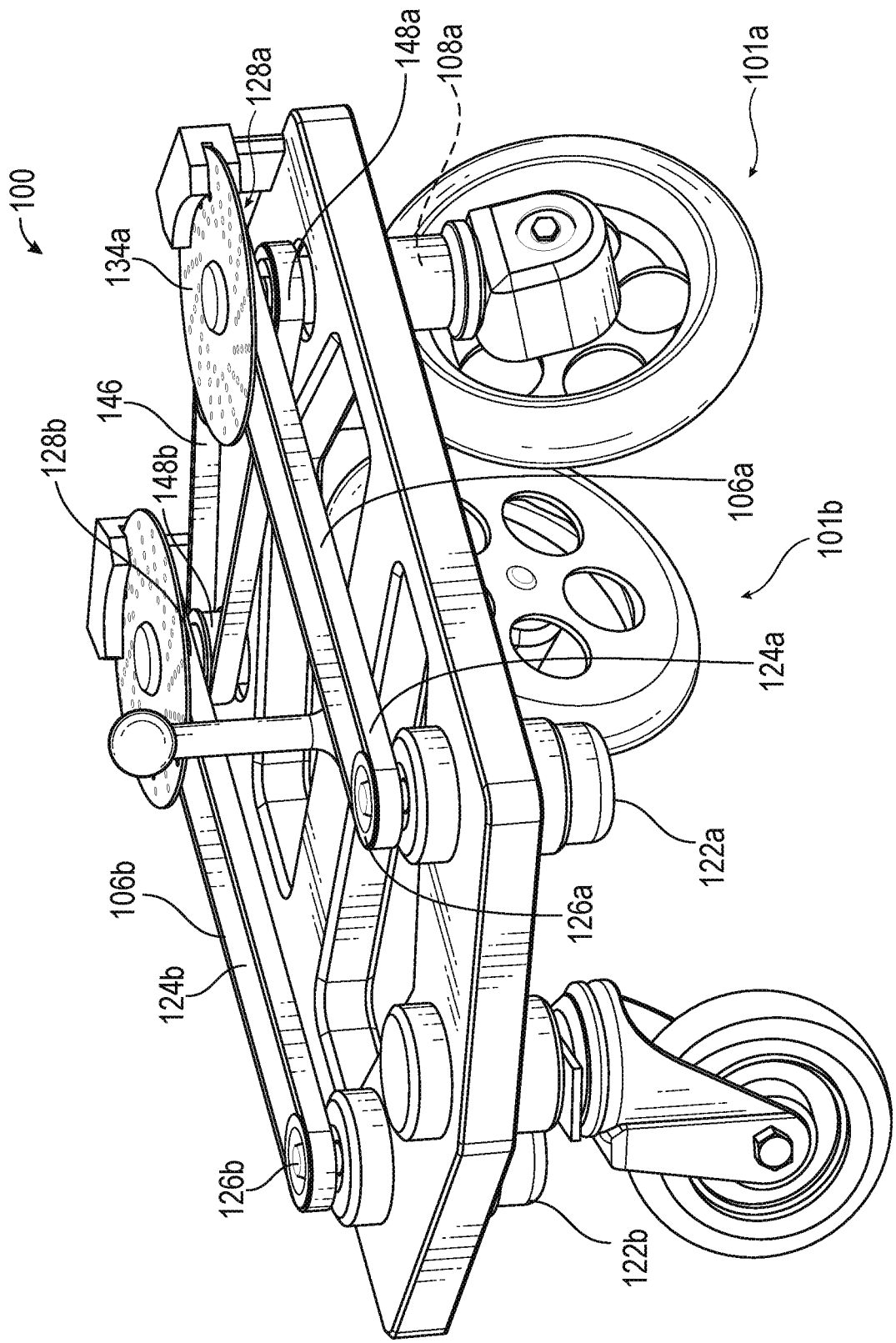
FIG. 3 is front, right perspective view of the robotic platform of FIG. 1.

With reference to FIG. 3, the drive assemblies 106a, 106b may each include drive motors 122a, 122b and drive belts 124a, 124b that rotate about the motor pulleys 126a, 126b and the drive shaft pulleys 128a, 128b. The power of the wheel assemblies 101a, 101b may be controlled by the respective drive shaft pulleys 128a, 128b that are mounted to or integral within the drive shafts 108a, 108b. As shown in FIG. 4, in some embodiments, the drive motor 122a may rotate about a substantially vertical drive motor axis M that extends substantially parallel (e.g., parallel or approximately parallel) to the steering axis S. Drive motor pulley 126a may be mounted to the upper portion of the drive motor 122a, and the respective drive shaft pulley 128a may be mounted to an upper portion of respective drive shaft 108a. The drive belt 124a may extend between the pulleys 126a, 128a and within a plane substantially perpendicular to the drive motor axis M and/or the steering axis S. Thus, the drive motor 122a may cause the drive motor pulley 126a to move about the drive motor axis M, which may in turn cause the drive belt 124a to move about the drive pulleys 126a, 128a, thereby causing the pulley 128a and the drive shaft 108a to rotate about the steering axis S. The drive motors 122a, 122b may be controlled independently of one another by a controller (e.g., an electrical system programmed with logic, with encoders, and/or with other electronic elements to control robotic platform 100) to provide differential power. The terms "differential power" and/or "differential drive," as used herein, generally refers to supplying independent power and/or control to at least two different wheels of a robotic assembly.

Figure 5:
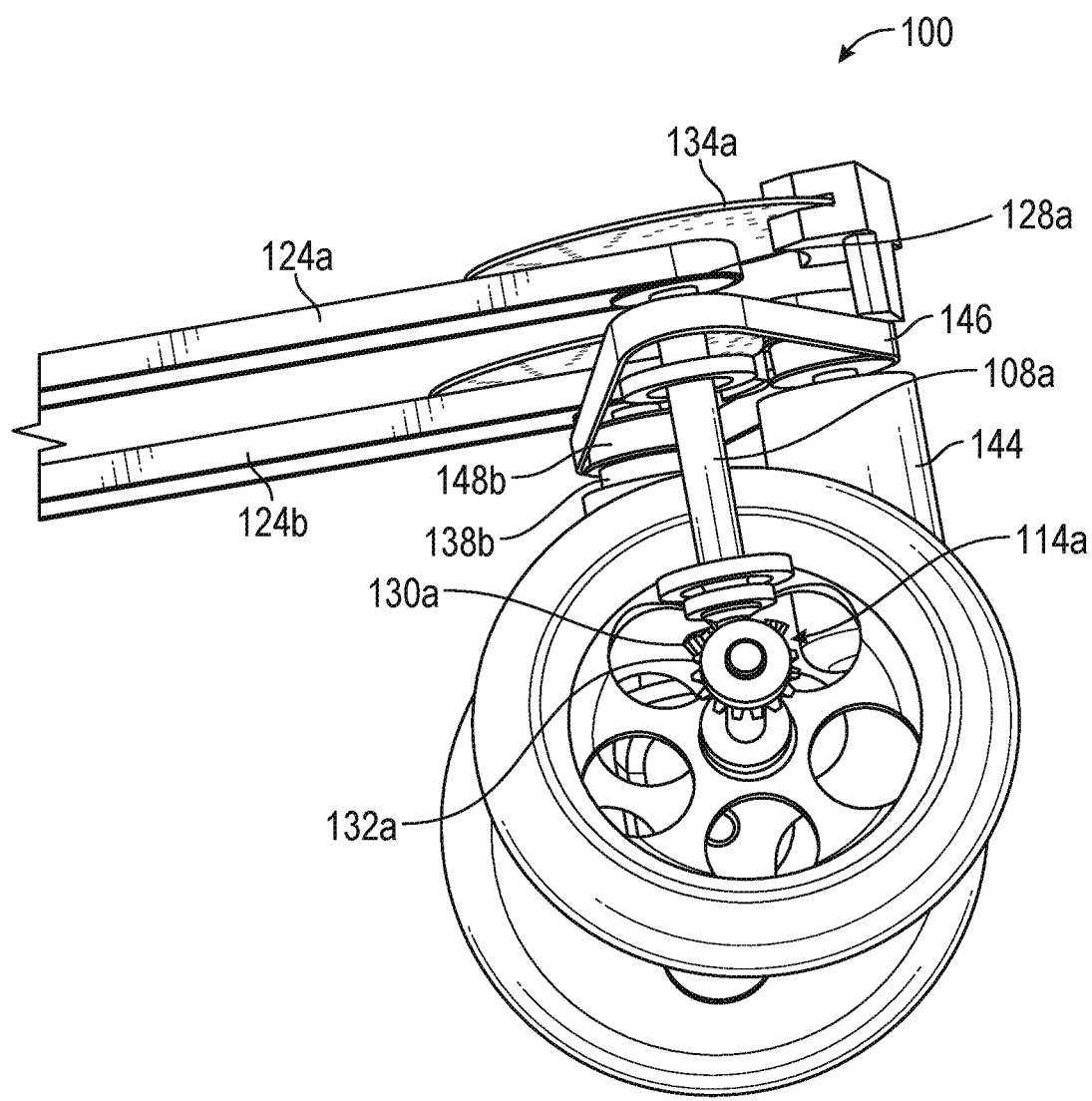
FIG. 5 is a view of the robotic platform of FIG. 1 with the chassis removed.

Referring to FIGS. 4-6, the torque and power from the drive motor 122a may be transferred from the drive shaft 108a to the respective axle 104a via the bevel gear 114a. The drive shaft 108a and axle 104a may function as the shafts of the bevel gear 114a. Mating gears 130a, 132a may be disposed on the lower portion of the drive shaft 108a and axle 104a. Thus, the bevel gear 114a may transfer and change the direction of the power and torque from the drive assembly 106a to the wheel 102a. As shown in FIG. 5, the bevel gear 114a is a miter gear, and the mating gears 130a, 132a provide a gear ratio of 1:1. The bevel gear 114a, however, can have other suitable configurations and gear ratios while remaining within the scope of this disclosure. For example, the mating gears 130a, 132a may include any suitable number of teeth. Also, the intersection of the drive and steering axes can form any suitable angle while remaining within the scope of this disclosure.

As described herein, drive power may be provided to the wheel 102a by way of the substantially vertical drive shaft 108a that extends along only one side of the wheel 102a from the axle 104a to a location entirely above the wheel (e.g., above chassis 120). As such, the wheel 102a may be able to freely rotate 360 degrees about the steering axis S. This configuration may offer many advantages from a steering and maneuverability standpoint. In addition, the configuration of the drive shaft 108a and the bevel gear 114a may result in a robotic platform 100 that may be free of wires or other electrical components extending close to the wheels 102a, 102b. For example, since the drive shaft 108a may receive power at its upper end and transfer power to the wheel 102a at its lower end via the bevel gear 114a, the drive belt 124a may be located entirely above the wheel, and the electrical components may be disposed distally from the wheel 102a, leaving a simple gearing configuration proximate the wheel 102a.

In some embodiments, brakes 116a, 116b may be disposed entirely above the respective wheels 102a, 102b. The brakes 116a, 116b may each be disposed on the respective upper drive shaft ends and configured to retard motion of the respective drive shafts 108a, 108b about the steering axis, thereby retarding motion of the respective wheels 102a, 102b about the drive axis. Any suitable brake configuration may be used. In one example, the brake 116a may represent a disc brake, including a disc 134a arranged on the upper drive shaft end and configured to rotate about the steering axis along with the drive shaft 108a. As shown in FIGS. 2-5, the disc 134a may be mounted to the upper drive shaft end by being mounted to the drive shaft pulley 128a. The disc 134a may have top and bottom surfaces, with each extending in a horizontal plane that is substantially perpendicular to the steering axis. A retarding mechanism may be provided to retard motion of the disc 134a. Any suitable type of retarding mechanism may be provided. In the embodiment herein described, the retarding mechanism includes top and bottom pads 136a, 136b disposed proximate the top and bottom surfaces of the disc 134a, respectively. At least one of the pads 136a, 136b may be compressible towards the disc 134a such that the pads 136a, 136b pinch the disc 134a to thereby retard its motion about the steering axis.

In the embodiment shown and herein described, a steer assembly 118 may be provided to control the steering of the wheels 102a, 102b about the steering axis. For each of the wheel assemblies 101a, 101b steer shafts 138a, 138b may extend along the steering axis from a bottom steer shaft end to a top steer shaft end. The bottom steer shaft end may be connected to the axle 104a, and the top steer shaft end may be coupled to the steer assembly 118, such that the steer assembly 118 controls rotation of the steer shaft 138a about the steering axis, which in turn steers the wheel 102a about the steering axis. The bottom steer shaft end may be mounted to the axle 104a via a casting 152a such that the axle 104a rotates about the steering axis along with the steer shaft 138a, thus causing the wheel 102a to rotate about the steering axis. As described in further detail below, the wheel 102a may be tilted with respect to the steering axis.

In one example, the steer assembly 118 may include a steer motor 144, steer belt 146, a steer motor pulley 150, and steer shaft pulleys 148a, 148b, the operation of which may be similar to that of the drive assembly 106a. The steer motor 144 and steer belt 146 may control the steer shafts of both wheel assemblies 101a, 101b, to thus steer the wheels 102a, 102b synchronously. The steer motor 144 may extend substantially vertically. The steer motor 144 and drive motors 122a, 122b may be disposed on opposite ends or sides of the chassis 120 from one another (e.g., on fore and aft ends, on left and right sides). In the embodiment shown in FIGS. 1-6, the drive motors 122a, 122b may be disposed on the fore end of the chassis 120 and the steer motor 144 on the aft end of the chassis 120. The steer belt 146 and steer pulleys 150, 148a, 148b, may rotate within a plane that is substantially parallel to and below the plane in which the drive motors 122a, 122b, drive belts 124a, 124b, and drive pulleys 126a, 126b, 128a, 128b rotate. The steer shaft pulley 148a that is arranged on the steer shaft 138a may be disposed beneath the drive shaft pulley 128a that is arranged on the drive shaft 108a.

With reference to FIG. 6, in some embodiments, the steer shaft 138a may be arranged concentrically with respect to the drive shaft 108a. More particularly, the steer shaft 138a and drive shaft 108a may each extend along the steering axis, with the drive shaft 108a being disposed within the steer shaft 138a. As such, and as shown in FIGS. 5 and 6, the drive shaft 108a may be connected to the axle 104a via the bevel gear 114a, and the steer shaft 138a may be mounted to the axle 104a via a casting 152a that is disposed around the bevel gear 114a.

As shown in FIG. 6, in some embodiments, the bevel gear 114a may be configured so that the wheel 102a is tilted with respect to the steering axis. This tilt may reduce scrubbing action when the wheel turns, and thus improve durability and steering capabilities. As shown in FIG. 6, a wheel axis may extend along the length of the wheel, perpendicular to the drive axis. In this example, the wheel axis does not extend parallel to the steering axis, but rather is tilted at an angle relative thereto. As such, while the drive shaft and steering axis extend in a substantially vertical direction, the axle and drive axis may extend in a direction that is not horizontal. In other words, the bevel gear 114a may be configured such that the steering axis and drive axis form an angle that is oblique. In some examples, the wheel 102a is tilted at an angle so that when the robotic platform 100 is on a surface, the wheel rotates about the steering axis at a point that is its center of mass. For example, for a wheel and tire configuration having a diameter substantially equal to 16 inches, the bevel gear may be configured so that the angle between the drive axis and steering axis is about 110 degrees and the angle between the steering axis and the wheel is equal to about 20 degrees.

As shown in FIGS. 1-6, the entire chassis 120 may be arranged above the wheels 102a, 102b, and the drive and steer shafts 108a, 108b, 138a, 138b may extend from the respective axle through the surface of chassis 120 to a location at or above a top surface of the chassis 120. In addition, the drive and steer belts 124a, 124b, 146 and pulleys 126a, 126b, 128a, 128b, 150, 148a, 148b, may be located at or above the top surface of the chassis 120. Also, the drive and steer motors 122a, 122b, 144 may be located distally from the wheels 102a, 102b. Thus, with the chassis disposed between the wheel and the drive and steer belts and pulleys, and the drive and steer motors 122a, 122b, 144 located distally from the wheels 102a, 102b, the drive and steer assemblies may be protected from environmental conditions that may surround the wheel.

In some embodiments, drive belts 124a, 124b may be wrapped directly around the circumference of at least one of the drive motor 122a, 122b or drive shaft 108a without a separate pulley component (e.g., the bottom portion of the drive motors 122a, 122b and/or top portion of the drive shafts 108a, 108b may function as a pulley).

The term "wheel," in some examples, generally refers to any suitable type of disc or other object that is rotatable about an axis. Examples of wheels include, without limitation, a disc-shaped object that is configured to roll along a surface, a propeller capable of converting rotational movement to thrust (e.g., to drive a boat through the water), or any other type or form of rotatable object. The robotic platform described herein can have a multitude of applications. For example, the robotic platform may support a robot that is configured to navigate through extreme environmental conditions, perform surgery in a hospital, manage a data center, etc.

While the robotic platform 100 is referred to herein as having a fore end with an idle caster wheel 158 and an aft end with driven wheel assemblies 101a, 101b, the disclosed robotic platform 100 may move in multiple directions such that the aft end, right side, and left side may also be located at the front of the robotic platform 100. For example, the disclosed robotic platform may be capable of moving in all directions on a substantially horizontal surface. In one instance, the wheels 102a, 102b may both turn about the steering axis 90 degrees, such that the right side of the robotic platform 100 becomes the front of the vehicle as it moves horizontally across the surface. This may be particularly advantageous when navigating the robotic platform 100 between objects or barriers. For example, in order to "parallel park" the robotic platform 100 into a space between two objects, the platform does not need to maneuver to angle forward and backwards in the traditional process for parallel parking. Rather, the robotic platform 100 may be positioned beside and parallel to a space, turn the wheels 102a, 102b to be directed to the space (e.g., turn the wheels 102a, 102b 90 degrees), and then simply move linearly (e.g., in a sideways direction) into the space. Also, the robotic platform 100 may move in a backward direction without using a reverse gear. Thus, the robotic platform 100 may be capable of moving in the backward direction with the same speed as in the forward direction.

The robotic platform 100 may be used in a variety of contexts and/or may be used to support a variety of different types of robots. For example, the robotic platform 100 may support an autonomous or semi-autonomous data center robot. In this example, the robotic platform 100 may enable the data center robot to move through aisles of a data center to install, remove, and/or service rack mount units and modules within the data center. Additionally or alternatively, multiple instances of robotic platform 100 may support a robotic gantry capable of moving among data center aisles and servicing modules within the aisles at various different heights.

As another example, the robotic platform 100 may support a telepresence robot. In this example, the robotic platform 100 may enable to telepresence robot to move from one location to another, to move to the optimal location for interacting with another robot or human, and/or to move in any other suitable manner.

Figure 7:
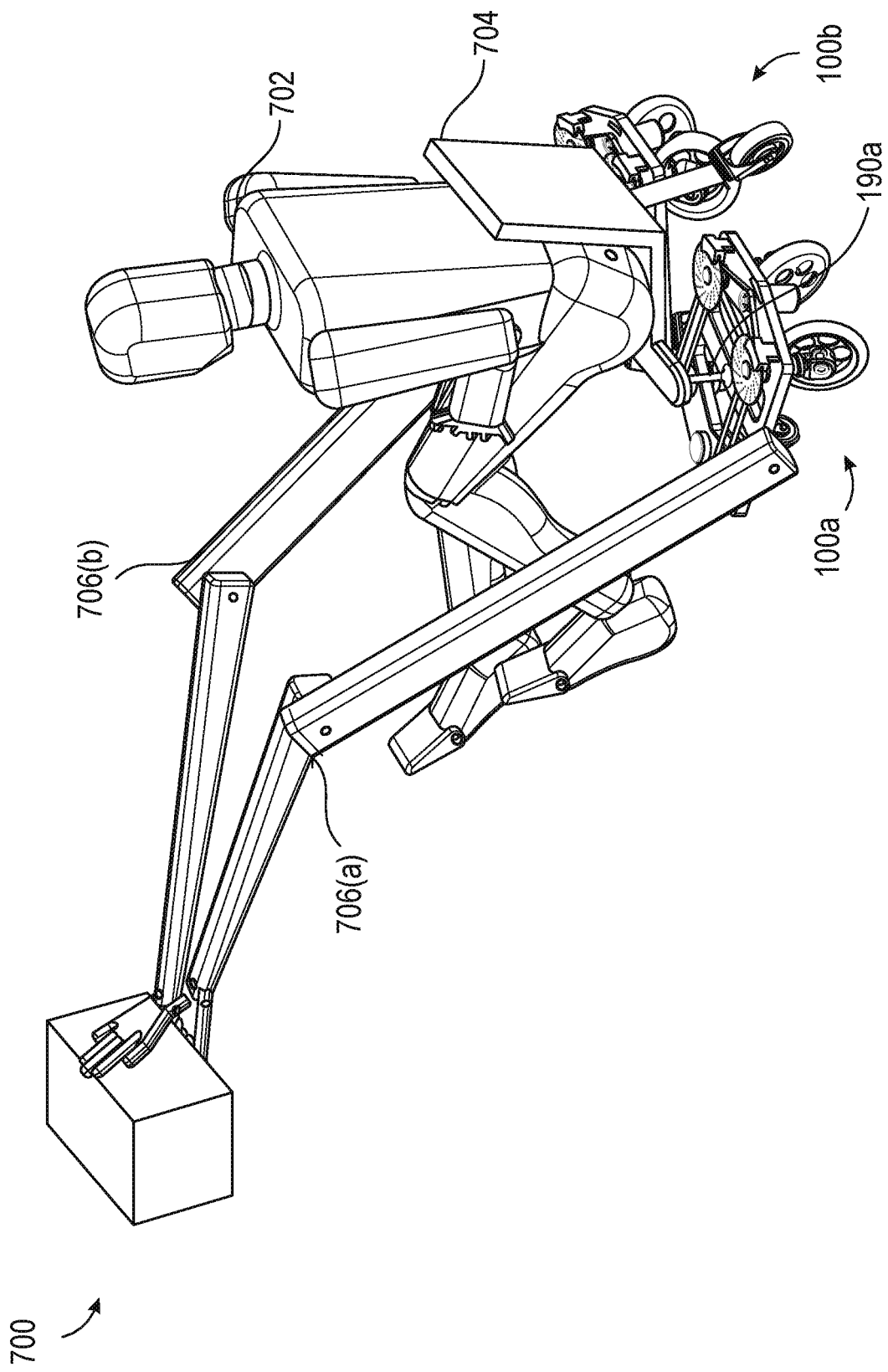
FIG. 7 is a perspective view of two of the robotic platforms from FIG. 1 being used to support an accessibility robot.

A third example is provided in FIG. 7, which shows an accessibility robot 700 mounted on two instances of robotic platform 100, shown as platforms 100a, 100b. In this example, a chair 704 may be coupled to platform 100a at ball joint 190a and platform 100b at a ball joint not visible in FIG. 7. Accessibility robot 700 may also include arms 706a, 706b coupled to platforms 100a, 100b, respectively. A user 702 may control arms 706a, 706b via any suitable control interface (e.g., using voice control, using a joystick or control pad, etc.) to perform a variety of tasks. Similarly, the user 702 may use a control interface to direct platforms 100a, 100b to move accessibility robot 700 from one location to another.

While several distinct examples of using robotic platform 100 have been presented, robotic platform 100 may be utilized in any other suitable context and/or to support any other suitable type or form of robot.

Figure 8:
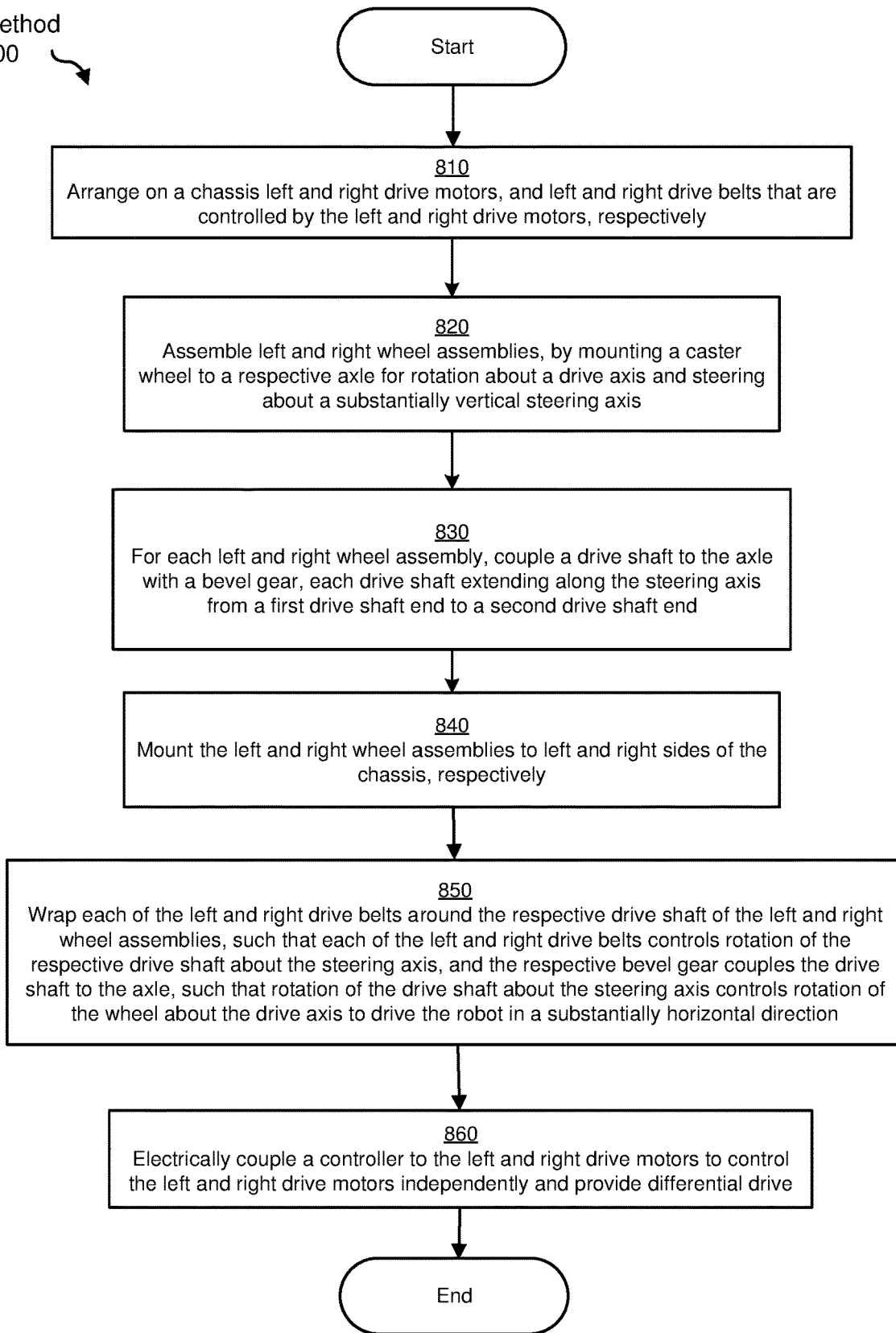
FIG. 8 is a flow diagram of a method of assembling a differential drive robotic platform, according to an embodiment.

Referring now to FIG. 8, also disclosed herein is a method 800 of assembling a differential drive robotic platform, such as the robotic platform 100 described above with reference to FIGS. 1-6. In step 810, a right drive motor and right drive belt may be arranged on a right side of a chassis, and a left drive motor and left drive belt may be arranged on a left side of the chassis. In steps 820 and 830, left and right wheel assemblies may be assembled. In step 820, for each left and right wheel assembly, a caster wheel may be mounted to a respective axle for rotation about a drive axis and steering about a substantially vertical steering axis. In step 830, for each left and right wheel assembly, a first end of a drive shaft may be coupled to the axle with a bevel gear, such that each drive shaft extends along the steering axis from the first end to a second end. In step 840, the left and right wheel assemblies may be mounted to left and right sides of the chassis, respectively. In step 850, the left and right drive belts may be wrapped around the drive shaft of the left and right wheel assemblies, respectively, such that the drive belt controls rotation of the drive shaft about the steering axis. Each bevel gear may couple the respective drive shaft to the axle such that rotation of the drive shaft about the steering axis controls rotation of the wheel about the drive axis to move the robotic platform in a substantially horizontal direction. In step 860, a controller may be electrically coupled to the left and right drive motors. The controller may be coupled to the left and right drive motors independently of one another, to provide differential power.

The disclosed robotic platform may provide many advantages. For example, the robotic platform's power assembly may be located entirely outside the circumference of the wheel, thus protecting the power assembly from forceful impacts as well as environmental conditions that may surround the robotic platform. Similar benefits may be achieved by disposing a brake assembly distally from the wheel. The robotic platform disclosed herein may also allow the wheel to freely rotate 360 degrees about its steering axis without becoming entangled by electrical wires or other components of the drive assembly. The disclosed robotic platform may provide differential power, which may enable improved steering and maneuverability.

The methods and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A robotic platform, comprising:
 a chassis having oppositely disposed top and bottom sides, left and right sides, and a fore end and an aft end;
 left and right driven wheel assemblies disposed proximate left and right sides of the chassis, each of the left and right driven wheel assemblies comprising:
  a caster wheel mounted to an axle for rotation about a drive axis and steering about a substantially vertical steering axis, the caster wheel being positioned at the aft end of the chassis;
  a drive shaft extending along the steering axis from a first drive shaft end to a second drive shaft end;
  a drive motor positioned at the fore end of the chassis and coupled to the second drive shaft end via a drive belt; and
  a bevel gear connecting the first drive shaft end to the axle such that rotation of the drive shaft about the steering axis controls rotation of the caster wheel about the drive axis to drive the robotic platform in a substantially horizontal direction;
 a controller for controlling the left and right drive motors independently of one another; and
 a steer assembly disposed on the chassis, the steer assembly comprising a steer motor positioned at the aft end of the chassis and a steer belt, wherein:
  each of the left and right driven wheel assemblies includes a steer shaft extending longitudinally along the steering axis from a first steer shaft end to a second steer shaft end; and
  the first steer shaft end is coupled to the axle.

2. The robotic platform of claim 1, wherein the controller is further configured to control the steer motor.

3. The robotic platform of claim 1, wherein the steer belt is wrapped around both the second steer shaft end of the steer shaft of the left driven wheel assembly and the second steer shaft end of the steer shaft of the right driven wheel assembly such that the caster wheel of the left driven wheel assembly and the caster wheel of the right driven wheel assembly rotate synchronously.

4. The robotic platform of claim 1 wherein, in each of the left and right driven wheel assemblies, the drive shaft is concentrically arranged inside of the steer shaft.

5. The robotic platform of claim 1, wherein at least one of the left and right driven wheel assemblies comprises a brake arranged on the second drive shaft end and dimensioned to retard motion of the drive shaft to thereby retard motion of the caster wheel.

6. The robotic platform of claim 5 wherein the brake comprises a disc brake, the disc brake comprising:
 a disc disposed on the drive shaft and configured to rotate with the drive shaft about the steering axis; and
 a pair of pads on top and bottom sides of the disc, wherein the pads are compressible against the disc to retard rotation of the disc and thereby retard rotation of the drive shaft.

7. The robotic platform of claim 1, wherein the drive axis and the steering axis together form an oblique angle such that the caster wheel is tilted relative to the steering axis.

8. The robotic platform of claim 1, wherein the caster wheel is configured to freely rotate 360 degrees about the steering axis.

9. The robotic platform of claim 1, further comprising at least one idle caster wheel disposed proximate the fore end of the chassis.

10. The robotic platform of claim 1, wherein the second drive shaft end and the drive motor are disposed on top of the chassis.

11. A robot comprising:
 a chassis having oppositely disposed top and bottom sides, left and right sides, and a fore end and an aft end;
 left and right driven wheel assemblies, each of the left and right driven wheel assemblies comprising:
  a caster wheel mounted to an axle for rotation about a drive axis and steering about a steering axis, the caster wheel being positioned at the aft end of the chassis;
  a drive shaft extending along the steering xis from a first drive shaft end to a second drive shaft end;
  a motor positioned at the fore end of the chassis and coupled to the second drive shaft end via a drive belt; and
  a bevel gear coupling the first drive shaft end to the axle such that rotation of the drive shaft about the steering axis controls rotation of the caster wheel about the drive axis to drive the robot in a substantially horizontal direction;
 a controller configured to control the left and right drive motors independently of one another; and
 a steer assembly disposed on the chassis, the steer assembly comprising a steer motor positioned at the aft end of the chassis and a steer belt, wherein:
 each of the left and right driven wheel assemblies includes a steer shaft extending longitudinally along the steering axis from a first steer shaft end to a second steer shaft end; and
 the first steer shaft end is coupled to the axle.

12. The robot of claim 11, wherein:
 the controller is further configured to control the steer motor to steer the robot.

13. The robot of claim 12, wherein the steer belt is wrapped around the steer shafts of the left and right driven wheel assemblies such that the steer shafts rotate synchronously.

14. The robot of claim 12, wherein for each of the left and right driven wheel assemblies, the drive shaft is concentrically arranged inside of the steer shaft.

15. The robot of claim 11, wherein for each of the left and right driven wheel assemblies, a brake is arranged on the second drive shaft end and configured to retard motion of the drive shaft to thereby retard motion of the caster wheel.

16. The robot of claim 15, wherein the brake comprises a disc brake having:
 a disc arranged on its respective drive shaft and configured to rotate with the drive shaft about the steering axis, and
 a pair of pads on top and bottom sides of the disc, wherein the pads are compressible against the disc to retard rotation of the disc and thereby retard rotation of its respective drive shaft.

17. The robot of claim 11, wherein for each drive wheel assembly, the bevel gear is configured such that the caster wheel is tilted relative to the steering axis so that the caster wheel is steerable about the steering axis at a single point of rotation.

18. The robot of claim 11, wherein for each driven wheel assembly, the caster wheel is configured to freely rotate freely 360 degrees about the steering axis.

19. A method of assembling a robotic platform, comprising:
 arranging a drive assembly on a chassis, the drive assembly comprising:

a left drive motor and a left drive belt that is controlled by the left drive motor, and a right drive motor and a right drive belt that is controlled by the right drive motor;

assembling left and right driven wheel assemblies, wherein assembling the driven wheel assemblies comprises:

mounting a caster wheel to an axle for rotation about a drive axis and steering about a substantially vertical steering axis; and coupling a first end of a drive shaft to the axle with a bevel gear, wherein the drive shaft extends along the steering axis from the first end of the drive shaft to a second end of the drive shaft;

mounting the left driven wheel assembly to a left side of the chassis such that the left drive motor is positioned at a fore end of the chassis and the caster wheel of the left driven wheel assembly is positioned at an aft end of the chassis;

mounting the right driven wheel assembly to a right side of the chassis such that the right drive motor is positioned at the fore end of the chassis and the caster wheel of the right driven wheel assembly is positioned at the aft end of the chassis;

wrapping the left drive belt around the drive shaft of the left driven wheel assembly such that the left drive belt controls rotation of the drive shaft about its steering axis;

wrapping the right drive belt around the drive shaft of the right driven wheel assembly, such that the right drive belt controls rotation of the drive shaft about its steering axis;

electrically coupling a controller to the left and right drive motors to control the left and right drive motors independently from one another and provide differential power; and arranging a steering assembly at an aft end of the chassis, the steering assembly comprising a steer motor and a steer belt that is controlled by the steer motor;

wherein for each of the left and right driven wheel assemblies, the bevel gear couples its respective first drive shaft end to the axle, such that rotation of the drive shaft about the steering axis controls rotation of the caster wheel about the drive axis to drive the robotic platform in a substantially horizontal direction.

20. The method of claim 19, wherein:

assembling each of the left and right driven wheel assemblies further comprises coupling a first end of a steer shaft to the axle, each steer shaft extending along the steering axis from the first end of the steer shaft to a second end of the steer shaft; and arranging the steering assembly further comprises wrapping the steer belt around each steer shaft such that the steer assembly controls rotation of each steer shaft about its respective steering axis, which thereby steers the caster wheel about the steering axis.

* * * * *

UNITED STATES PATENT AND TRADEMARK OFFICE
CERTIFICATE OF CORRECTION

PATENT NO. : 10,678,242 B2  
APPLICATION NO. : 15/828423  
DATED : June 9, 2020  
INVENTOR(S) : Scott C. Wiley Page 1 of 1

It is certified that error appears in the above-identified patent and that said Letters Patent is hereby corrected as shown below:

In the Claims

In Column 12, Line 13, Claim 11, delete "xis" and insert -- axis --, therefore.

In Column 12, Lines 62-63, Claim 18, delete "rotate freely" and insert -- rotate --, therefore.

In Column 14, Line 2, Claim 19, delete "assembly," and insert -- assembly --, therefore.

Signed and Sealed this  
Twenty-eighth Day of July, 2020

Andrei Iancu  
*Director of the United States Patent and Trademark Office*